United States Patent [19]

Crist

[11] 4,266,452
[45] May 12, 1981

[54] OIL FILTER WRENCH
[76] Inventor: Robert M. Crist, R.D. 4, Oswego, N.Y. 13126
[21] Appl. No.: 111,608
[22] Filed: Jan. 14, 1980
[51] Int. Cl.³ .............................................. B25B 13/06
[52] U.S. Cl. .................................. 81/121 R; 81/90 B; 7/100
[58] Field of Search ................. 81/3.1 B, 3.1 D, 90 B, 81/90 D, 121 R; 7/100, 138

[56] References Cited
U.S. PATENT DOCUMENTS

| | | | |
|---|---|---|---|
| 3,014,389 | 12/1961 | O'Hara | 81/90 D |
| 3,385,141 | 5/1968 | Norman | 81/90 D |
| 3,635,106 | 1/1972 | Homs | 81/90 B UX |
| 3,911,983 | 10/1975 | Wyatt | 81/90 D X |
| 4,177,529 | 12/1979 | Sikula, Jr. | 7/100 |

Primary Examiner—James G. Smith
Attorney, Agent, or Firm—Charles S. McGuire

[57] ABSTRACT

A special purpose tool for applying torque to a cannister-type oil filter to engage and disengage the threaded end thereof with an engine block. The tool is generally cup-shaped, having an internal surface for engaging the polygonal end of the filter in the manner of a socket wrench. The open end of the tool is flared to a larger diameter than the filter body for catching oil which escapes as the filter is removed, and an internal space is provided to act as a reservoir for the escaping oil. Slots are provided in the lower surface of the tool for receiving a bar to increase the applied torque.

8 Claims, 4 Drawing Figures

OIL FILTER WRENCH

BACKGROUND OF THE INVENTION

The present invention relates to special purpose tools of the wrench type and, more specifically, to a tool for applying torque to a cannister-type oil filter for threaded engagement with and disengagement from an engine block.

Most cannister-type oil filters for internal combustion engines in current use have a standardized external configuration. One end of the cannister includes a threaded portion for engagement with like threads on the engine whereon the filter is to be used, and is cylindrical from the threaded end for the major portion of its length. The remaining portion is of polygonal cross section and the end opposite that which includes the threads is essentially flat.

Although the torque which is applied to the filter cannisters when they are installed on or removed from an engine block is not unduly large, it is usually greater than that which can be applied manually. Therefore, some means in the nature of a wrench is required in order to apply the required torque. The most common tool in current use for installing and removing oil filter cannisters comprises a flexible band which encircles and frictionally engages the cylindrical body of the cannister, and a radially extending handle.

Although such tools are convenient and effective for installation and removal of the cannisters, a small amount of hot, dirty oil will usually drain from the engine immediately upon removal of the filter, even though the oil pan has previously been drained. In some cases, the leakage of one or two ounces of oil is of no consequence, but in other instances such leakage may be objectionable. This particularly evident where the engine is mounted in a boat or other location where the oil which leaks out upon removal of the filter may accumulate within an enclosed space.

It is a principal object of the present invention to provide a tool for the installation and removal of cannister-type engine oil filters which collects any oil that may leak from the engine upon removal of the filter.

In a more general sense, the object of the invention is to provide a novel and improved special purpose wrench for applying torque to an oil filter cannister which is threadedly engaged with an engine block.

Other objects will in part be obvious and will in part appear hereinafter.

SUMMARY OF THE INVENTION

In the preferred embodiment, the tool is a one-piece element which may be conveniently and economically fabricated from molded plastic, or the like. It is of cup-like form, having internal dimensions related to the standard external configuration of cannister-type oil filters currently in widespread use. The open end of the tool has an internal diameter somewhat larger than that of the filter body and tapers inwardly to a polygonal socket which is dimensioned to engage the end of the filter cannister, which has an external configuration conforming to that of the socket. A space is provided between the lower end of the socket and the closed end of the tool to act as a reservoir for oil which leaks from the engine around the sides of the filter cannister and is thus received in the outwardly flared upper end of the tool. Slots are provided on the exterior of the lower, closed end of the tool for receiving a separate bar which may be used as a lever arm or handle to apply torque to the tool.

DETAILED DESCRIPTION

Figure 1:
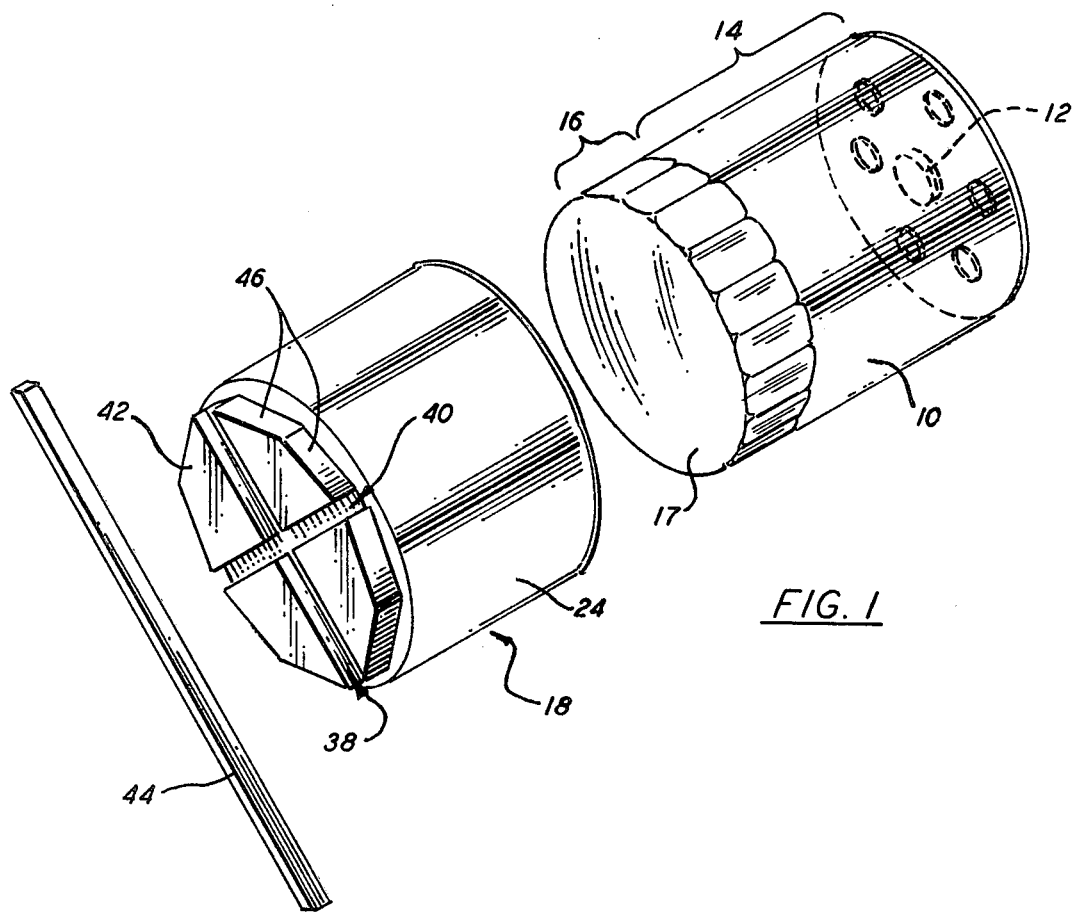
FIG. 1 is a perspective view of a conventional engine oil filter cannister and the tool of the present invention prior to engagement of the tool with the filter cannister.
Figure 4:
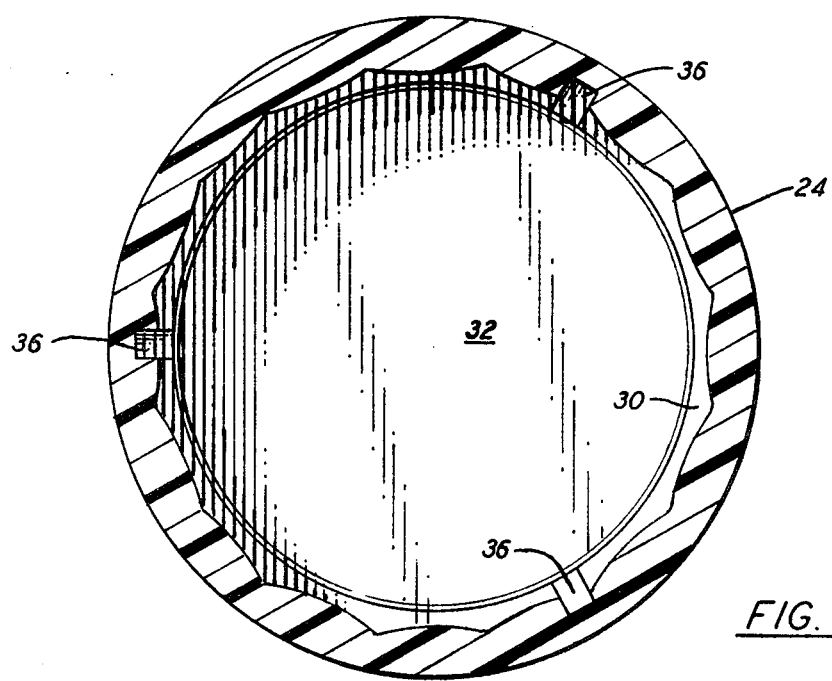
FIG. 4 is a plan view in section on the line 4-4 of FIG. 2.

Referring now to the drawings, in FIG. 1 is shown an oil filter cannister, designated generally by reference numeral 10, for use on an internal combustion engine. Cannister 10 is conventional in all respects, being commercially available in the form shown, one end thereof having internal threads 12 which mate with threads on a nipple extending from the engine block for the purpose of mounting the filter cannister thereon with the threaded end up. In external configuration, cannister 10 is cylindrical for a first portion 14 of its length extending from the end which includes threads 12 to second portion 16, which is polygonal in cross section, having a plurality of flat sides (15 in the most common commercial form). In most standard cannister configurations, cylindrical portion 14 comprises slightly more than three quarters of the cannister length and polygonal portion 16 slightly less than one quarter. Lower end 17 of cannister 10 is essentialy flat.

Figure 2:
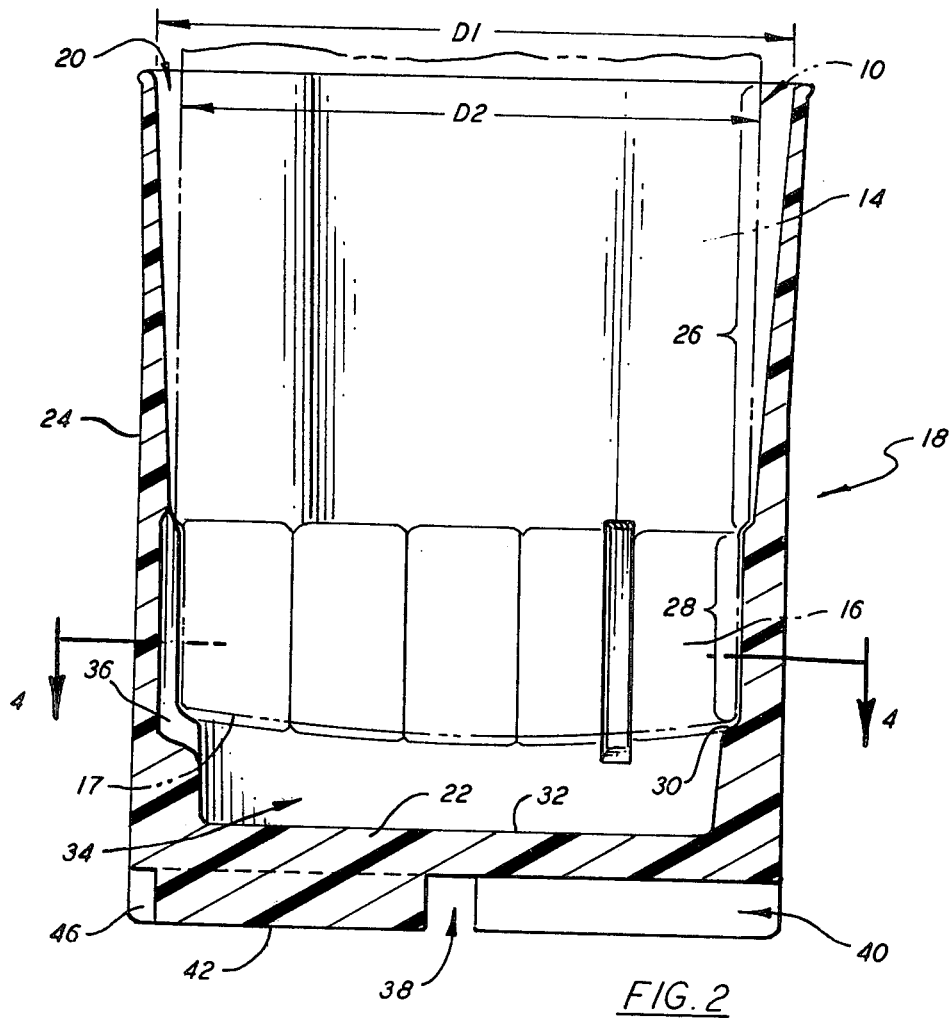
FIG. 2 is a front elevational view of the tool of FIG. 1 in section on the line 2-2 of FIG. 3, showing the tool engaged with the filter cannister, the outline of which is shown in phantom lines.
Figure 3:
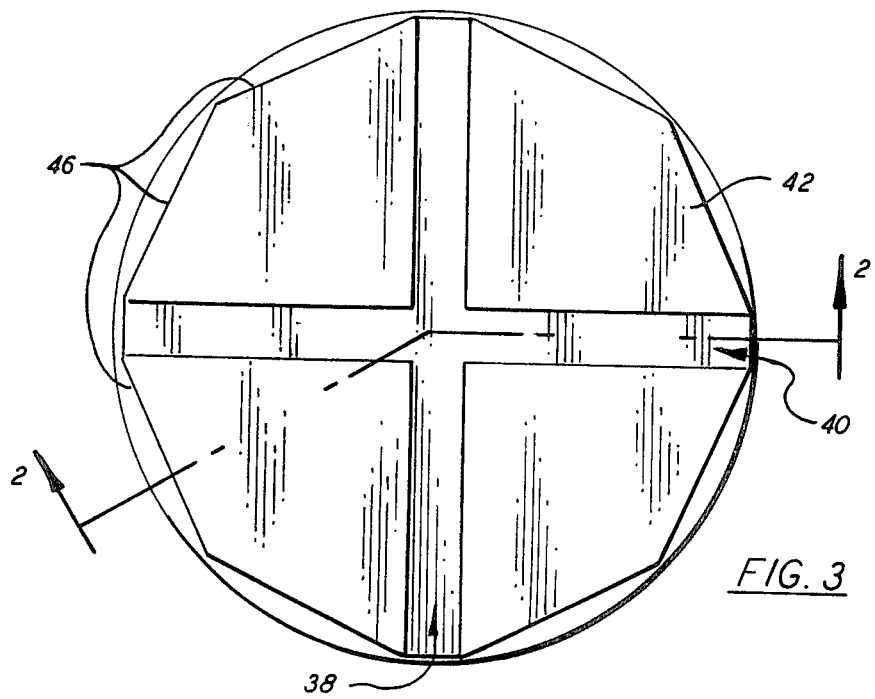
FIG. 3. is a bottom plan view of the tool.

The special purpose tool of the invention is denoted generally by reference numeral 18. Tool 18 is generally cup-shaped, having an open end 20, closed end 22 and side wall 24. The interior surface of tool 18 tapers inwardly from open end 20 for a first portion 26, which adjoins a second portion 28 of a cross section corresponding to that of cannister portion 16. The internal diameter of tool 18 at open end 20 is indicated in FIG. 2 by dimension D1, and is somewhat larger than diameter D2 of filter cannister cylindrical portion 14. Portion 28 of tool 18 forms a socket of equal or slightly larger dimensions than cannister portion 16, and terminates in an annular, stepped shoulder 30. Thus, when tool 18 is placed over filter cannister 10, portion 16 is received in portion 28, with the peripheral portion of lower cannister end 17 seated against shoulder 30, whereby torque applied to the tool is transmitted to the cannister. If desired, a preformed metal insert (not shown), conforming more precisely and rigidly to the external configuration of cannister portion 16 may be molded into the lower portion of the tool to form socket 28.

Inner surface 32 of lower wall 22 is offset from shoulder 30 by a distance sufficient to provide a cylindrical space 34 between surface 32 and lower end 17 of a cannister seated within tool 18. This space serves as a reservoir for the hot and dirty oil which leaks from the engine as the filter cannister is removed therefrom. The oil will normally run down the sides of the cannister, or drip closely about the sides and thus be received in outwardly flared, open end 20 of tool 18. The fit of portion 16 of the cannister in the socket formed by portion 28 of tool 18 is preferably loose enough that the oil can continue to run down between the cannister and interior of the tool, through the socket and into space 34, while being tight enough, of course, for the necessary torque transmission. However, if tolerances are such that the fit may be too close to allow the leaking oil to drain freely into the reservoir, one or more grooves, such as those indicated by reference numeral 36 may be formed in the interior of wall 24 to provide direct communication between portion 26 and space 34 of tool 10.

Two open slots 38 and 40 are formed in the outside, lower surface 42 of bottom wall 22. The slots extend completely across the bottom wall at 90° to one another. Square bar 44, as seen in FIG. 1, may be placed in either of slots 38 and 40, and held in place with one hand (which also serves to hold tool 18 in engagement with cannister 10) as force is applied to the bar with the other hand in other to exert the necessary torque on tool 18 and cannister 10. The outside surface of wall 24 may be formed with flat sides 46, to permit the use of spanner-type wrenches to apply torque to the tool rather than bar 44, if desired. Flat sides 46 may be formed at the lower end of wall 24, as shown, or at other positions thereof.

From the foregoing it may be seen that the stated objects of the invention are achieved by the illustrated and described embodiment, which provides a special purpose tool by means of which standard, cannister-type oil filters may be installed upon an engine, as well as removed therefrom without objectionable leakage or spillage of excess oil.

What is claimed is:

1. A special purpose tool for installation and removal of cannister oil filters of the type having an external configuration which is cylindrical for a first portion of its length and polygonal for a second portion, said cylindrical portion having a predetermined diameter, and said first and second cannister portions having predetermined lengths, said tool comprising:
    (a) a peripherally contiguous side wall having an internal cross section which is circular for a first portion of its length extending from an open end to a second portion having an internal cross section of polygonal configuration substantially matching the external configuration of said cannister second portion;
    (b) said wall first portion tapering from an inside diameter at said open end which is larger than said predetermined diameter to an inside diameter at the juncture of said wall first and second portions which is substantially equal to said predetermined diameter;
    (c) the length of said first and second wall portions being not greater than that of said first and second cannister portions, respectively;
    (d) an inwardly extending portion at the end of said wall second portion opposite the juncture thereof with said wall first portion, said inwardly extending portion limiting the extent to which said cannister second portion may be inserted into said wall second portion; and
    (e) secondary wall means defining a reservoir on the side of said wall second portion opposite said inwardly extending portion and communicating with the interior of said wall first portion, whereby when said tool is held with said open end up, any oil received in said wall first portion through said open end drains into and is captured by said reservoir.

2. The invention according to claim 1 wherein said inwardly extending portion comprises a stepped, annular shoulder.

3. The invention according to claims 1 or 2 wherein said interior of said wall first portion communicates with said reservoir through at least one groove in the interior surface of said side wall.

4. The invention according to claims 1 or 2 wherein said secondary wall means comprise a substantially cylindrical portion and an end wall providing a closed end of said tool.

5. The invention according to claims 1 or 2 and further including means on the exterior of said tool for engagement by torque-applying means.

6. The invention according to claim 1 wherein said reservoir includes an end wall defining a closed end of said tool.

7. The invention according to claim 6 and further including at least one groove formed in the exterior of said end wall for receiving a torque-applying bar.

8. The invention according to claims 6 or 7 wherein said end wall includes at least two flat, parallel surfaces on the exterior sides thereof for engagement by a torque-applying spanner wrench.

* * * * *